United States Patent
Grant et al.

(10) Patent No.: US 9,091,240 B2
(45) Date of Patent: Jul. 28, 2015

(54) COMPRESSED NATURAL GAS FUEL MASS CONTROL SYSTEM

(71) Applicant: Caterpillar Inc., Peoria, IL (US)

(72) Inventors: Steven Thomas Grant, Groveland, IL (US); Frank Lombardi, Metamora, IL (US); Daniel Reese Puckett, Peoria, IL (US); Cory A. Brown, Peoria, IL (US); Joshua Wayne Steffen, El Paso, IL (US); Paul Joseph Desiderio, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 239 days.

(21) Appl. No.: 13/749,011

(22) Filed: Jan. 24, 2013

(65) Prior Publication Data

US 2014/0202429 A1    Jul. 24, 2014

(51) Int. Cl.
*F02G 5/00* (2006.01)
*F02M 69/00* (2006.01)
*F02M 21/02* (2006.01)
*F02D 19/02* (2006.01)

(52) U.S. Cl.
CPC ............... *F02M 69/00* (2013.01); *F02D 19/02* (2013.01); *F02M 21/02* (2013.01); *F02M 21/023* (2013.01); *F02M 21/0218* (2013.01); *F02M 21/0236* (2013.01); *F02M 21/0239* (2013.01); *Y02T 10/32* (2013.01)

(58) Field of Classification Search
CPC ... F02M 69/00; F02M 21/02; F02M 21/0218; F02M 21/023; F02M 21/0287; F02M 21/06; F02M 21/0239
USPC ............. 123/445, 527, 27 GE, 464, 465, 577, 123/41.05, 41.08, 41.136, 41.31, 540, 541, 123/543, 557, 525, 553, 554, 552, 555, 123/545; 62/48.1; 165/293, 292, 297
See application file for complete search history.

(56) References Cited

U.S. PATENT DOCUMENTS 4,180,036 A  * 12/1979  Wolf ............................. 123/557
4,524,747 A  *  6/1985  van den Wildenberg et al. ............................. 123/557

(Continued)

FOREIGN PATENT DOCUMENTS

CA        2819966 A1 *  5/2013  ............. F02M 21/06
DE   102010040612 A1     3/2012

(Continued)

*Primary Examiner* — Lindsay Low
*Assistant Examiner* — George Jin
(74) *Attorney, Agent, or Firm* — Miller, Matthias & Hull LLP

(57) ABSTRACT

A system, related method and computer program product are disclosed for controlling fuel mass of CNG received by an engine. The system may comprise a heat exchanger configured to receive CLNG and supply coolant and to output CNG and return coolant, an injector configured to inject CNG into the engine, a gas line between the injector and heat exchanger, a control valve configured to receive return coolant from the heat exchanger and to change the amount of return coolant flowing through control valve, and a controller connected to the control valve. The gas line may be configured to carry CNG from the heat exchanger to the injector. The controller may be configured to maintain a Gas Line Temperature within an operating range by adjusting the amount of return coolant flowing through the control valve based, at least in part, on the Gas Line Temperature and a Target Return Coolant Temperature.

18 Claims, 7 Drawing Sheets

(56) References Cited

U.S. PATENT DOCUMENTS

| | | | |
|---|---|---|---|
| 5,314,007 A * | 5/1994 | Christenson | 165/43 |
| 5,375,582 A * | 12/1994 | Wimer | 123/563 |
| 5,483,943 A * | 1/1996 | Peters | 123/527 |
| 5,499,615 A * | 3/1996 | Lawrence et al. | 123/526 |
| 5,671,711 A * | 9/1997 | Collie | 123/299 |
| 5,755,203 A * | 5/1998 | Mastumoto | 123/403 |
| 6,230,683 B1 | 5/2001 | zur Loye et al. | |
| 6,886,758 B1 | 5/2005 | Wieczorek et al. | |
| 7,182,073 B1 | 2/2007 | Kim | |
| 7,343,895 B2 | 3/2008 | Mark | |
| 7,657,347 B2 * | 2/2010 | Campbell et al. | 700/300 |
| 7,775,268 B2 * | 8/2010 | Sato et al. | 165/202 |
| 7,853,397 B2 | 12/2010 | Pott et al. | |
| 7,870,849 B2 * | 1/2011 | Ceratto | 123/527 |
| 2002/0166545 A1 * | 11/2002 | Stone | 123/527 |
| 2004/0144370 A1 * | 7/2004 | Mey et al. | 123/527 |
| 2004/0187851 A1 * | 9/2004 | Sexton et al. | 123/527 |
| 2012/0031371 A1 | 2/2012 | Sabathil | |
| 2012/0186560 A1 | 7/2012 | Lund | |
| 2012/0222430 A1 * | 9/2012 | Madsen | 62/48.1 |
| 2013/0220590 A1 * | 8/2013 | Lang et al. | 165/260 |

FOREIGN PATENT DOCUMENTS

| | | |
|---|---|---|
| JP | 7189848 | 9/2012 |
| KR | 20060024580 | 9/2012 |
| KR | 20090090752 | 9/2012 |

* cited by examiner

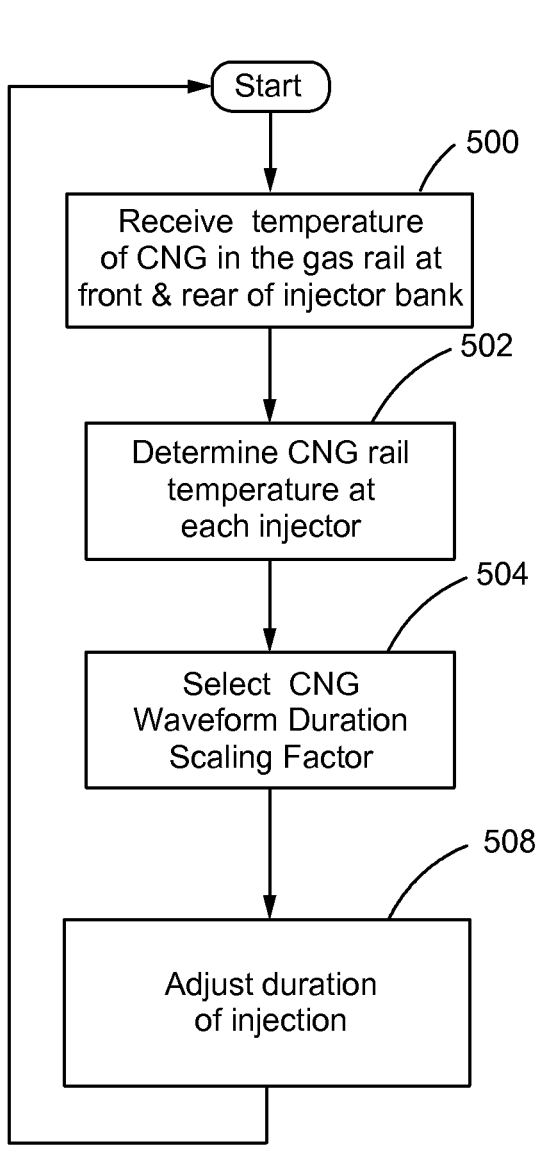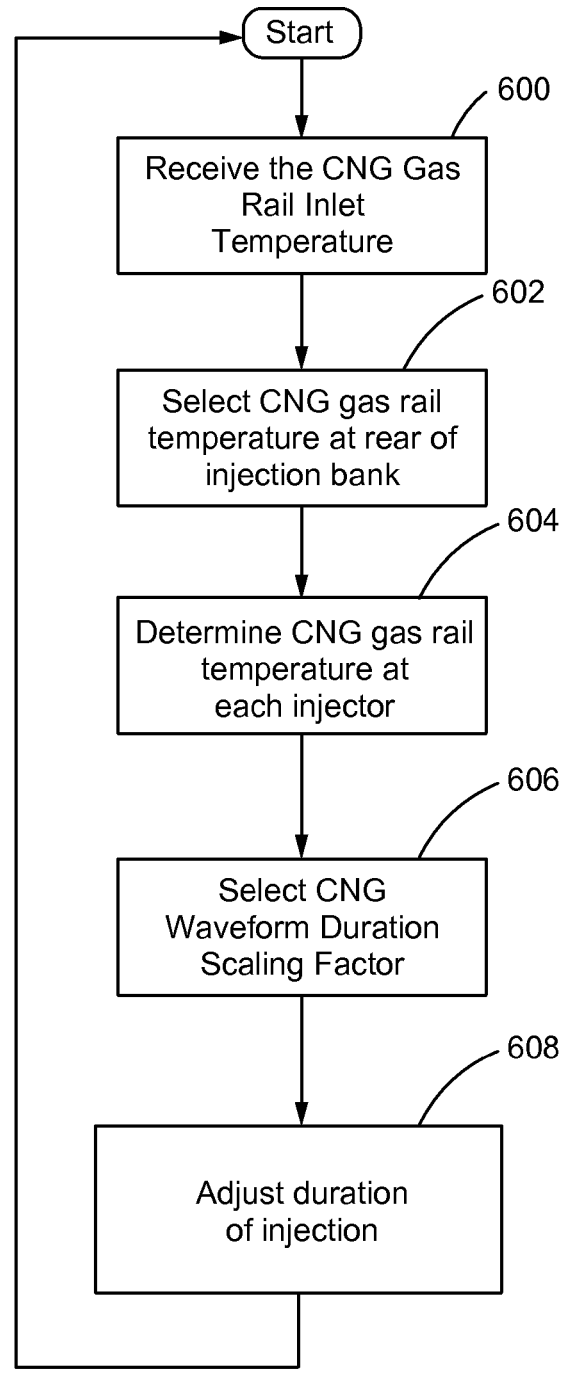
FIG. 7
FIG. 8

COMPRESSED NATURAL GAS FUEL MASS CONTROL SYSTEM

TECHNICAL FIELD

The present disclosure generally relates to compressed natural gas systems on vehicles and, more particularly, relates to compressed natural gas systems on vehicles used in earth moving, construction, material handling, mining applications, and the like.

BACKGROUND

Vehicle applications using compressed natural gas systems often operate in variable environmental conditions and under changing operational modes. Changes in ambient temperature and changes in operational modes (idling, moving, loading, and the like) may effect the density of the fuel delivered to the engine by high pressure direct injection. Stable and consistent engine power output may be improved by controlling the fuel mass of the compressed natural gas delivered to the engine. Consistent fuel mass delivery provides a combustion environment that allows for stable power generation regardless of changing environmental or operational conditions.

U.S. Pat. No. 7,182,073 issued Feb. 27, 2007 (the '073 patent) discloses a liquefied petroleum gas injection engine system on a vehicle. The system disclosed seeks to lower emissions by reducing leakage of fuel into the intake system of the engine after the engine has been in an off condition. The '073 patent discloses an engine control management system electronic control unit that controls the injection time and injection rate of the liquefied petroleum gas injected through the injector depending on the traveling conditions of the vehicle, more specifically whether the fuel system receives natural cooling by outside air while the vehicle is moving or whether the vehicle is stopped and natural cooling of the air is unavailable. This type of system has drawbacks because the temperature of the fuel delivered may vary widely. A better system is needed.

SUMMARY OF THE DISCLOSURE

In accordance with one aspect of the disclosure, a method of controlling the fuel mass of compressed natural gas received by an engine is disclosed. The method may comprise receiving a Gas Line Temperature for compressed natural gas disposed in a gas line, and maintaining, by a controller operably connected to a control valve, the Gas Line Temperature within an operating range by adjusting the amount of return coolant allowed to flow through the control valve based at least in part on the Gas Line Temperature and a Target Return Coolant Temperature. In an embodiment, the gas line may be disposed between a heat exchanger and the engine, and the heat exchanger may be configured to receive compressed liquid natural gas and supply coolant and to output the compressed natural gas into the gas line and to output return coolant. The control valve may be configured to receive return coolant from the heat exchanger.

In accordance with another aspect of the disclosure, a system is disclosed. The system may comprise a heat exchanger configured to receive compressed liquid natural gas and supply coolant and to output compressed natural gas and return coolant, an injector operably connected to the engine and configured to inject the compressed natural gas into the engine, a gas line disposed between the injector and the heat exchanger, a control valve configured to receive return coolant from the heat exchanger and to change the amount of return coolant flowing through control valve, and a controller operably connected to the control valve. The gas line may be configured to carry compressed natural gas from the heat exchanger to the injector. The compressed natural gas in the gas line may be at a Gas Line Temperature. The controller may be configured to maintain the Gas Line Temperature within an operating range by adjusting the amount of return coolant allowed to flow through the control valve based, at least in part, on the Gas Line Temperature and a Target Return Coolant Temperature.

In accordance with a further aspect of the disclosure, a computer program product is disclosed. The computer program product may comprise a non-transitory computer usable medium having a computer readable program code embodied therein. The computer readable program code may be adapted to be executed to implement a method for controlling the fuel mass of compressed natural gas received by an engine, the method comprising receiving a Gas Line Temperature for compressed natural gas disposed in a gas line, and maintaining, by a controller operably connected to a control valve, the Gas Line Temperature within an operating range by adjusting the amount of return coolant allowed to flow through the control valve based at least in part on the Gas Line Temperature and a Target Return Coolant Temperature. In an embodiment, the gas line may be disposed between a heat exchanger and the engine, and the heat exchanger may be configured to receive compressed liquid natural gas and supply coolant and to output the compressed natural gas into the gas line and to output return coolant. The control valve may be configured to receive return coolant from the heat exchanger.

BRIEF DESCRIPTION OF THE DRAWINGS

FIG. 7 is flowchart illustrating exemplary steps of a method of controlling the fuel mass of compressed natural gas received by an engine in accordance with the teachings of this disclosure; and FIG. 8 is flowchart illustrating exemplary steps of a method of controlling the fuel mass of compressed natural gas received by an engine in accordance with the teachings of this disclosure.

DETAILED DESCRIPTION

Figure 1:
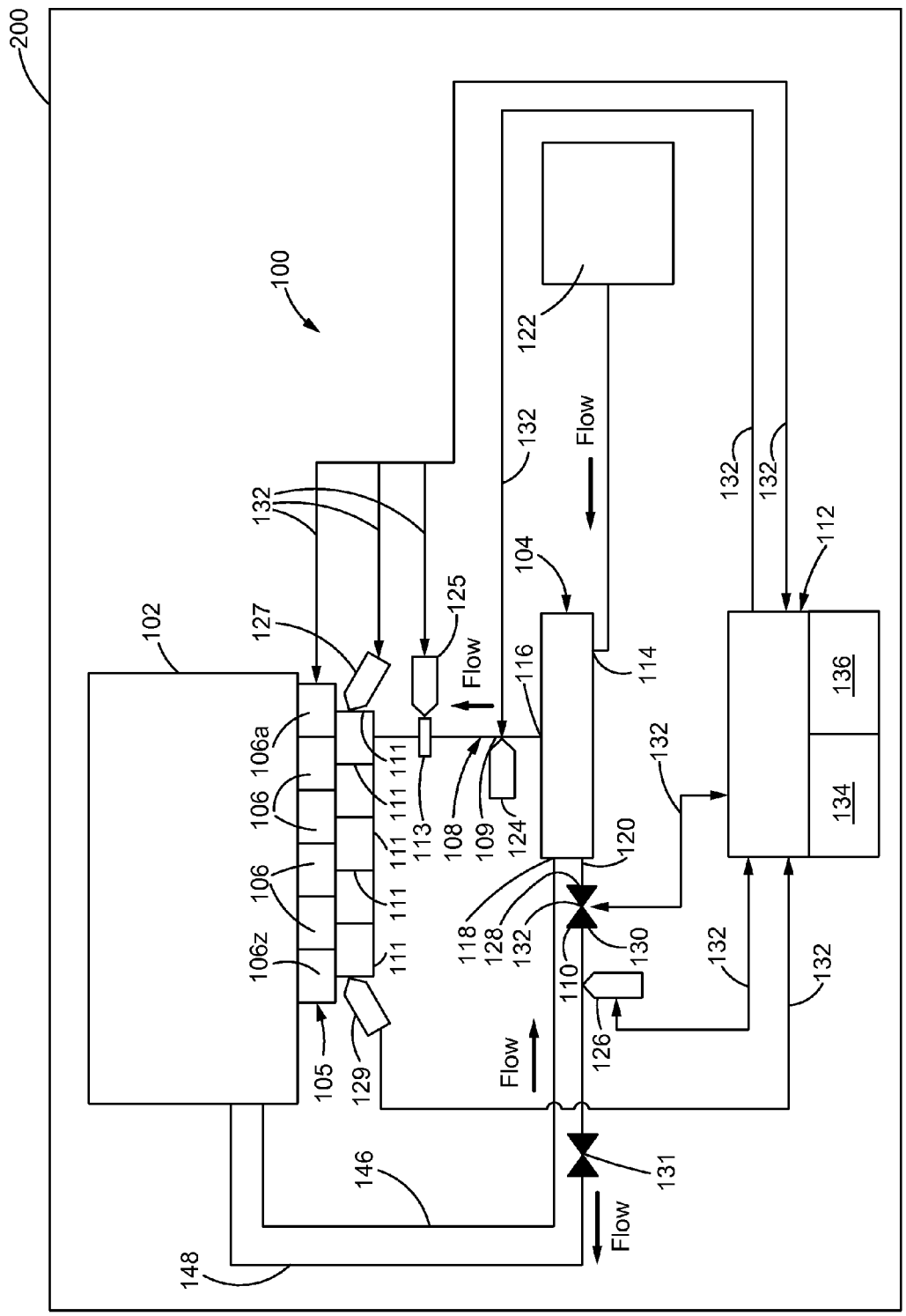
FIG. 1 is a general schematic view of an exemplary embodiment of a system constructed in accordance with the teachings of this disclosure.

Referring now to the drawings, and with specific reference to FIG. 1, there is shown one embodiment of a system, generally referred to by reference numeral 100, for controlling the fuel mass of compressed natural gas (CNG) received by an engine 102 in accordance with the present disclosure. The system 100 may comprise a heat exchanger 104, a bank 105 including one or more injectors 106, a CNG gas line 108, a control valve 110, a controller 112, a supply channel 146 and a return channel 148. The system may also include a gas line sensor 124 and a return coolant sensor 126. Some embodiments may also include a gas rail inlet sensor 125, a front temperature sensor 127 and a back temperature sensor 129. In addition, some embodiments may include a flow orifice 131.

While the following detailed description and drawings are made with reference to the system 100 mounted on a haul truck, the teachings of this disclosure may be employed on other mining, earth moving, construction, material handling, or the like vehicles. Such vehicles may be autonomously, semi-autonomously, or manually operated.

Figure 3:
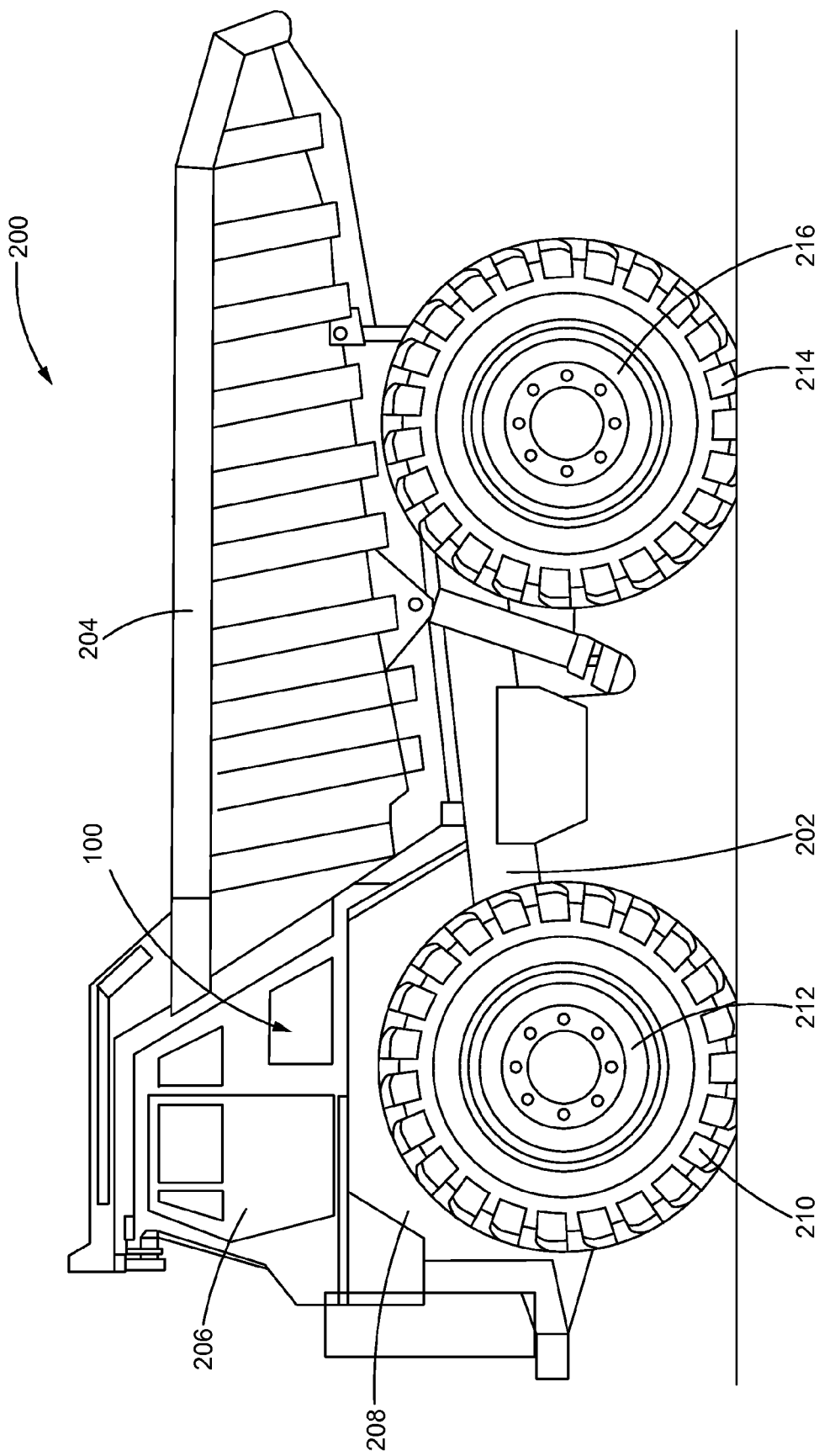
FIG. 3 is perspective view of an exemplary vehicle in which the system of either FIG. 1 or 2 may be used.

FIG. 3 illustrates one example of a vehicle 200 that incorporates the features of the present disclosure. The vehicle may be autonomous, that is remote controlled or having programmed movement, or may be semi-autonomous (having partially remote controlled or programmed functions), or may be manually operated. The vehicle 200 generally includes a main frame 202, a dump body 204 pivotally mounted to the main frame 202, and a cab 206 mounted on the front of the main frame 202 above an engine enclosure 208. The vehicle 200 is supported on the ground by front tires 210 (one shown) each mounted on one of two front wheel assemblies 212, and rear tires 214 (one shown) each mounted on one of two back (driven) wheel assemblies 216. One or more engines (not shown) may be housed within the engine enclosure 208 to supply power to the drive wheel assemblies 216 via a mechanical or electric drive train.

Turning back to FIG. 1, the heat exchanger 104 includes a first inlet 114, a first outlet 116, a second inlet 118 and a second outlet 120. The heat exchanger 104 is configured to receive through the first inlet 114 compressed liquid natural gas (CLNG) from a fuel source 122 disposed on the vehicle 200. The heat exchanger 104 is further configured to receive through the second inlet 118 supply coolant. The supply coolant may travel to the heat exchanger 104 through the supply channel 146. In an embodiment, the supply coolant may include engine coolant. In another embodiment, the supply coolant may be only engine coolant received from the engine 102 through the supply channel 146. The heat exchanger 104 is also configured to emit through the first outlet 116 CNG into the gas line 108 and to emit return coolant through the second outlet 120 into the return channel 148. The return channel 148 may extend between the heat exchanger 104 and the engine 102. The heat exchanger 104 may be any appropriate type of heat exchanger/vaporizer as is known in the art for heat transfer between a cold liquid (CLNG) and a warmer liquid (supply coolant).

The bank 105 includes a plurality of injectors 106. Each injector 106 may be operably connected to the engine 102 and is configured to inject the CNG into the engine 102, more specifically a combustion chamber (not shown) of the engine 102.

The gas line 108 may be disposed between the injectors 106 and the heat exchanger 104, and is configured to carry the CNG received from the heat exchanger 104 to the injectors 106. The (CNG) gas line 108 may include a main line 109 portion and a gas rail 111 portion. The main line 109 may extend between the heat exchanger 104 and the gas rail 111, and the gas rail 111 may extend between the main line 109 and the injectors 106. The gas line 108 may also include a gas rail inlet 113 disposed at the interface of the main line 109 and the gas rail 111.

The control valve 110 includes a first input port 128 and a first output port 130.

The gas line sensor 124 is configured to measure the temperature of the CNG in the gas line 108 (the "Gas Line Temperature"). The return coolant sensor 126 is configured to measure the temperature of the return coolant (the "Return Coolant Temperature"). The return coolant sensor 126 may be disposed relatively close to the second outlet 120 of the heat exchanger 104 to better reflect the temperature of the coolant in the heat exchanger 104.

In those embodiments in which the system 100 also includes the gas rail inlet sensor 125, the gas rail inlet sensor 125 is configured to measure the temperature of the CNG flowing into the gas rail 111 from the main line 109 ("Gas Rail Inlet Temperature"). In the embodiments in which the system 100 also includes front and back temperature sensors 127, 129, the front temperature sensor 127 may be disposed proximal to the first of the plurality of injectors 106 in the bank 105 and may be configured to measure the temperature of the CNG flowing in the gas rail 111 adjacent to or proximal to such first injector 106a. The back temperature sensor 129 may be disposed proximal to the last of the plurality of injectors 106 in the bank 105 and may be configured to measure the temperature of the CNG flowing in the gas rail 111 adjacent to or proximal to such last injector 106z.

The gas line sensor 124, the gas rail inlet sensor 125, the return coolant sensor 126, the front temperature sensor 127, and the back temperature sensor 129 may each be any appropriate sensor that is capable of capturing temperature data and transmitting such data through a communication channel 132 to the controller 112 for processing. The communication channel 132 may be an optical channel, or any other wired, wireless or radio channel or any other type of channel capable of transmitting data between two points.

In some embodiments, the system 100 may also include a flow orifice disposed in the return channel 148. The flow orifice 131 may be configured to tune the system flow rates and pressures as is known to do in the art.

The controller 112 may include a processor 134 and a memory component 136. The controller 112 may be operably connected to the injectors 106, the control valve 110, the gas line sensor 124, and the return coolant temperature sensor 126. In embodiments that include the gas rail inlet sensor 125 and/or the front temperature sensor 127 and the back temperature sensor 129, the controller may also be operably connected to such elements.

The processor 134 may be a microprocessor or other processor as known in the art. The processor 134 may execute instructions and generate control signals for processing Gas Line Temperature data, Return Coolant Temperature data, determining whether the Gas Line Temperature is in an operating range, determining a Target Return Coolant Temperature, and activating the control valve to control the flow of return fluid, and the like. In embodiments including the pump, the processor may also activate/deactivate the pump. In some embodiments, the processor 134 may execute instructions and generate control signals for controlling the duration of injection by the injectors. Such instructions may be read into or incorporated into a computer readable medium, such as the memory component 136 or provided external to the processor 134. In alternative embodiments, hard wired circuitry may be used in place of, or in combination with, software instructions to implement a control method.

The term "computer readable medium" as used herein refers to any non-transitory medium or combination of media that participates in providing instructions to the processor 134 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 134 can read.

The controller 112 is not limited to one processor 134 and memory component 136. The controller 112 may be several processors 112 and memory components 114.

Figure 2:
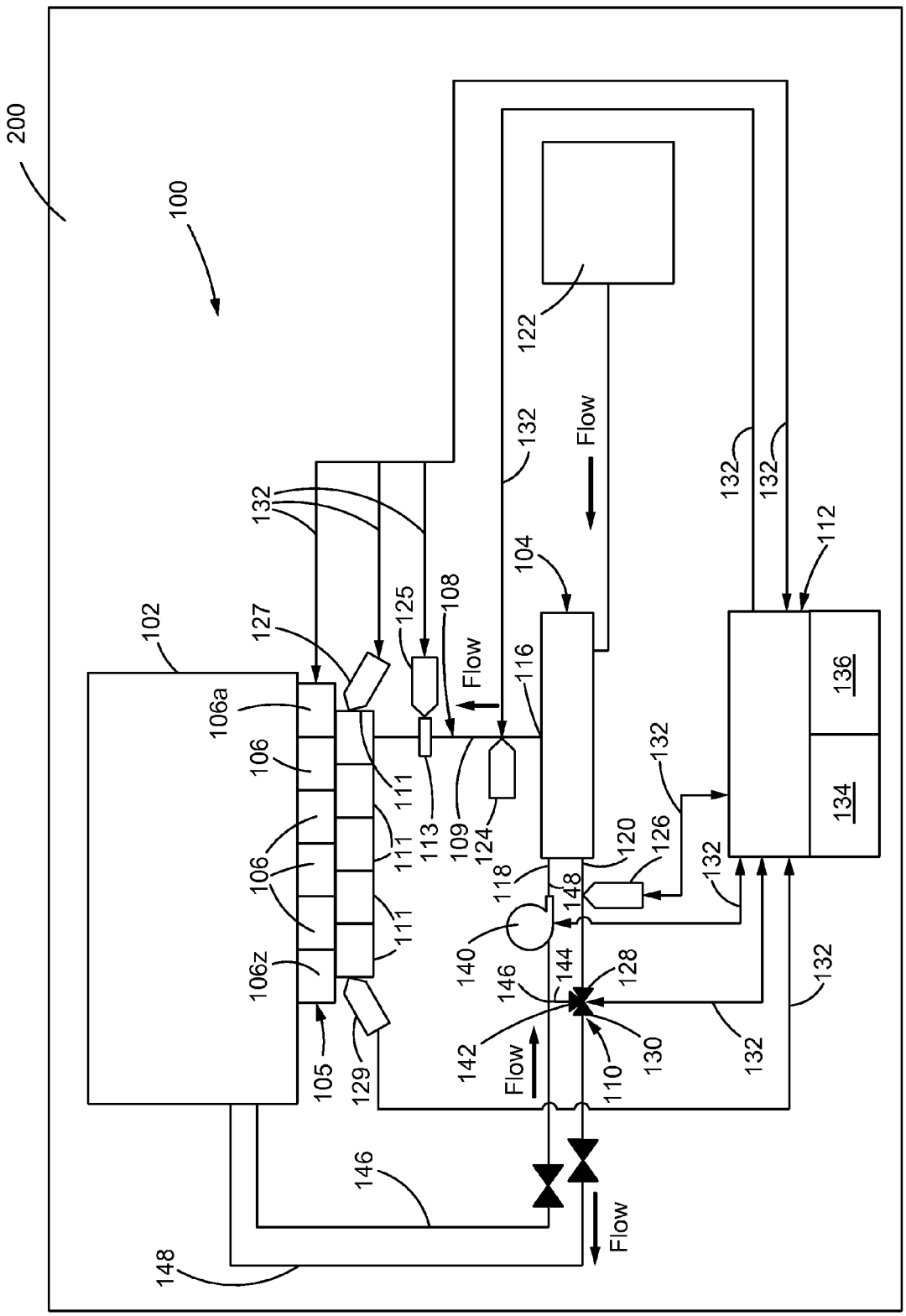
FIG. 2 is general schematic view of another exemplary embodiment of a system constructed in accordance with the teachings of this disclosure.

In an embodiment of the system 100 illustrated in FIG. 2, the control valve 110 may be a three-way valve and the system 100 may also include a pump 140.

The control valve 110 may be a three-way control valve and may include the first input port 128, the first output port 130, and a second output port 142. The second output port 142 may be configured to emit return coolant into a conduit 144 connecting the second outlet port 142 and the supply channel 146 feeding the pump 140.

The pump 140 may be disposed on the supply channel 146 between the engine 102 and the heat exchanger 104 and may be operably connected to the controller 112. The pump 140 may be configured to receive engine coolant from the engine 102 and return coolant from the control valve 110. In one embodiment the pump 140 may output supply coolant that includes engine coolant and return coolant. In such an embodiment, the return coolant received by the pump 140 may be received from the control valve 110 through the conduit 144. In another embodiment, the supply coolant output from the pump may only include engine coolant. In some embodiments, the pump 140 may be a variable-flow pump. In other embodiments, the pump 140 may be a constant output pump.

INDUSTRIAL APPLICABILITY

Figure 4:
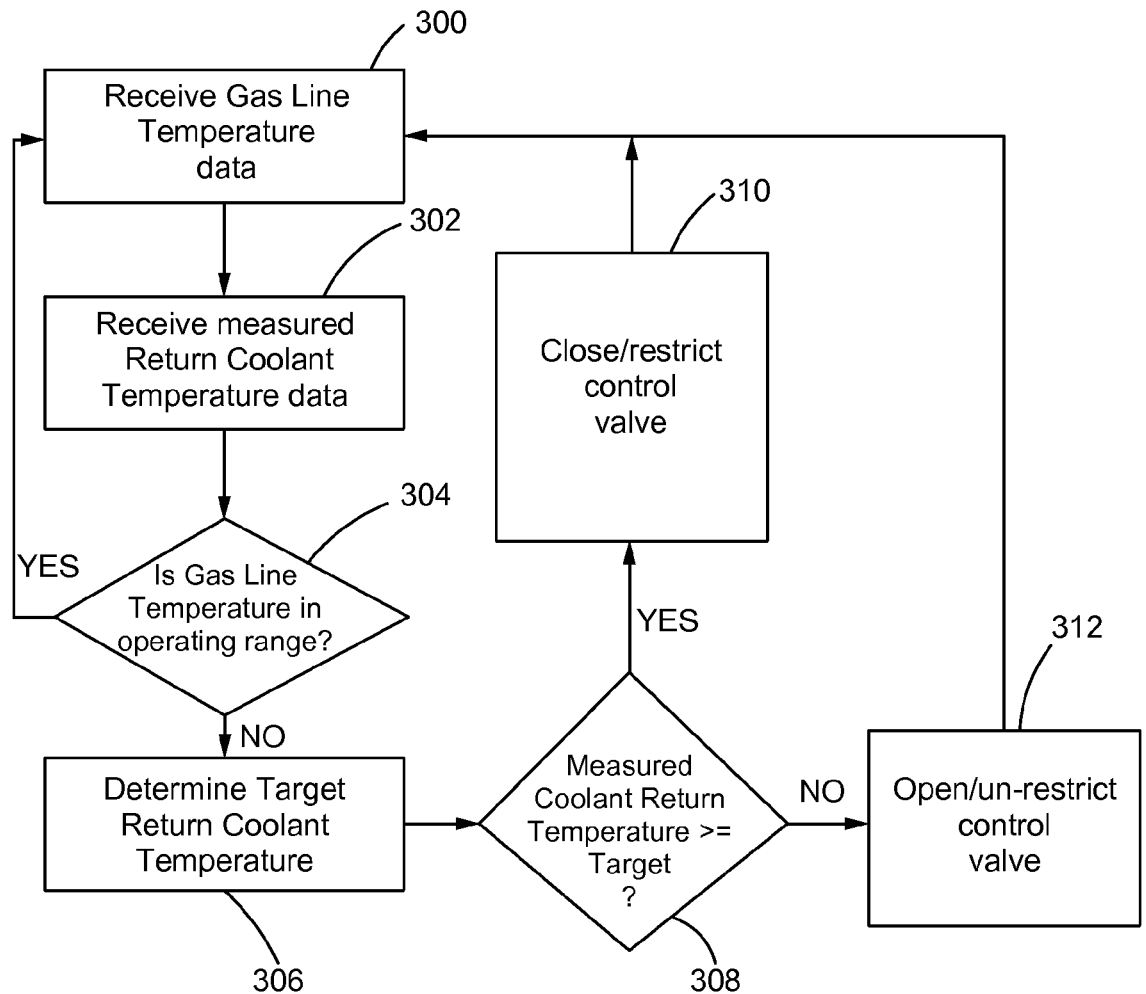
FIG. 4 is flowchart illustrating exemplary steps of a method of controlling the fuel mass of compressed natural gas received by an engine in accordance with the teachings of this disclosure.

Referring now to FIG. 4, an exemplary flowchart is illustrated showing sample steps which may be followed in controlling the fuel mass of CNG received by the engine 102 with the embodiment of the system 100 illustrated in FIG. 1. The method may be practiced with more or less than the number of steps shown and is not limited to the order shown.

Step 300 of the method includes receiving, by the controller 112, from the gas line sensor 124, the Gas Line Temperature data that indicates the temperature of the CNG disposed in the (CNG) gas line 108.

In step 302 includes receiving, by the controller 112, from the return coolant sensor 126, Return Coolant Temperature data that indicates the measured temperature of the return coolant proximal to the heat exchanger 104. In the embodiment of the system illustrated in FIG. 1, the Return Coolant Temperature data may, more precisely, indicate the temperature of the return coolant (from the heat exchanger 104) after it has exited the control valve 110 first output port 130.

In step 304, the Gas Line Temperature data is processed by the controller 112 to determine whether the Gas Line Temperature (of the CNG) is in an operating range. In some embodiments, this Gas Line Temperature may be determined from the Gas Line Temperature data received from the gas line sensor 124. In other embodiments, the Gas Line Temperature may be determined as a function of the Return Coolant Temperature or as a function of the Gas Line Temperature data and the Return Coolant Temperature data. The operating range may span a predetermined number of degrees anywhere in the range between about 10° C. and about 90° C. For example, in one embodiment, the operating range may span about 5° C. in the range between about 40° C. to about 45° C. In another embodiment, the operating range may span about 10° C. in the range between about 80° C. to about 90° C. In yet another embodiment, the operating range may be a target Gas Line Temperature, plus or minus ten percent. In yet another embodiment, the operating range may be a target Gas Line Temperature, plus or minus five percent. In yet another embodiment, the operating range may be a target Gas Line Temperature, plus or minus one percent. In yet another embodiment, the operating range may be about the target Gas Line Temperature. In an embodiment, the target Gas Line Temperature may be a temperature between about 10° C. and about 90° C.

If the Gas Line Temperature is not in the operating range, a target Return Coolant Temperature ("Target Return Coolant Temperature") is determined by the processor in step 306. In one embodiment, the Target Return Coolant Temperature may be determined based on one or more system parameters. For example, in an embodiment, the Target Return Coolant Temperature may be based on system parameters, or the combination of such parameters, as engine speed, the liquid natural gas (LNG) pump flow demand, the supply temperature, and the like. The supply temperature is the temperature of the supply coolant disposed in the supply channel 146. The processing done by the controller 112 to determine the Target Return Coolant Temperature may be done using, algorithms, look-up tables, mapping, hash tables or the like.

In step 308, the controller 112 determines if the (measured) Return Coolant Temperature is greater than or equal to the Target Return Coolant Temperature. If yes, the method proceeds to step 310, if no, the method proceeds to step 312.

In step 310, the controller 112 transmits a signal that causes the control valve 110 to either close or restrict the path of the return fluid passing through in the control valve 110 depending on the difference between the (measured) Return Coolant Temperature and the Target Return Coolant Temperature.

In step 312, the controller 112 transmits a signal that causes the control valve 110 to open or increase the flow of the return coolant through the control valve 110 depending on the difference between the (measured) Return Coolant Temperature and the Target Return Coolant Temperature. The amount the control valve 110 will be opened depends on the difference.

In an alternative embodiment, steps 306 and 308 of the flowchart in FIG. 4 may be omitted. In such an embodiment, if in step 304 the Gas Line Temperature is not in the operating range, the process would proceed to either step 310 or 312 depending on the measured Gas Line Temperature. If the measured Gas Line temperature is higher than desired, the process would proceed to step 310. If the measured Gas Line Temperature is lower than desired, the process would proceed to step 312. In a variation of this alternative embodiment, the process may proceed to steps 310 and 312 depending on both the measured Gas Line Temperature and the measured Return Coolant Temperature. If the measured Gas Line Temperature and the Return Coolant Temperature are both higher than desired, than the process would proceed to step 310. If the measured Gas Line Temperature and the Return Coolant Temperature are both lower than desired, the process would proceed to step 312.

Figure 5:
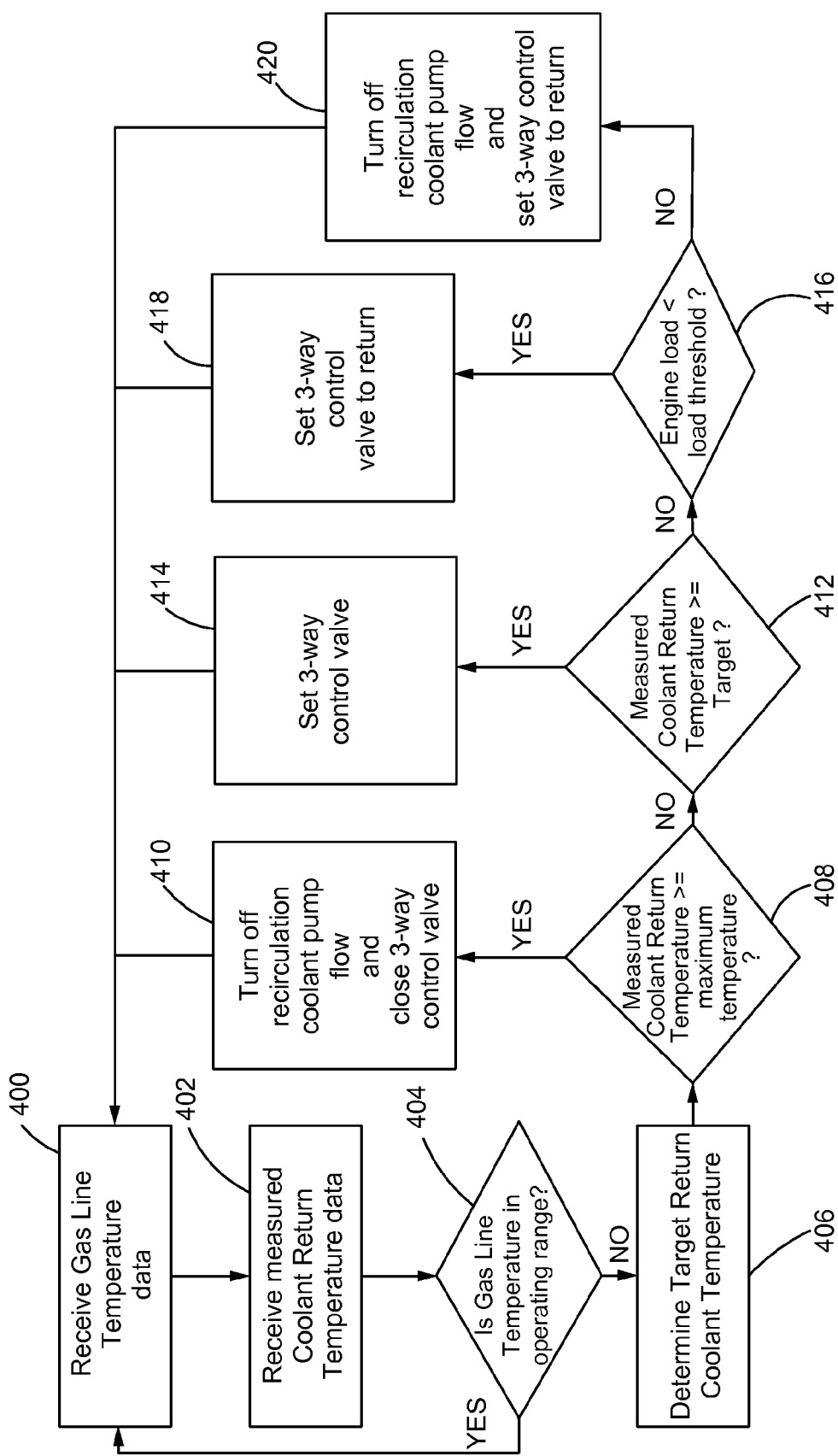
FIG. 5 is flowchart illustrating exemplary steps of a method of controlling the fuel mass of compressed natural gas received by an engine in accordance with the teachings of this disclosure.

Referring now to FIG. 5, an exemplary flowchart is illustrated showing sample steps which may be followed in controlling the fuel mass of CNG received by the engine 102 with the embodiment of the system 100 illustrated in FIG. 2 that includes the three-way control valve 110 and the pump 140.

The method may be practiced with more or less than the number of steps shown and is not limited to the order shown.

Step 400 of the method includes receiving, by the controller 112, from the gas line sensor 124, Gas Line Temperature data that indicates the measured temperature of the CNG (at the gas line sensor 124) disposed in the CNG gas line 108.

In step 402 includes receiving, by the controller 112, from the return coolant sensor 126, Return Coolant Temperature data that indicates the temperature of the return coolant exiting from the heat exchanger 104.

Similar to step 304 in FIG. 4, in step 404 in FIG. 5, the Gas Line Temperature data is processed by the controller 112 to determine whether the Gas Line Temperature (the temperature of the CNG) is in an operating range. Similar to step 304 in FIG. 4, the operating range may span a predetermined number of degrees in the range between about 10° C. and about 90° C. In some embodiments, this Gas Line Temperature may be determined from the Gas Line Temperature data received from the gas line sensor 124. In other embodiments, the Gas Line Temperature may be determined as a function of the Return Coolant Temperature or as a function of the Gas Line Temperature data and the Return Coolant Temperature data.

If the Gas Line Temperature is not in the operating range, a Target Return Coolant Temperature is determined by the processor in step 406. In one embodiment, the Target Return Coolant Temperature may be determined based on one or more system parameters. For example, in an embodiment, the target Return Coolant Temperature may be based on system parameters, or the combination of such parameters as engine speed, the LNG pump flow demand, the supply temperature, and the like. The processing done by the controller 112 to determine the target return coolant may be done using, algorithms, look-up tables, mapping, hash tables or the like.

In step 408, the controller 112 determines if the (measured) Return Coolant Temperature is greater than or equal to a predetermined maximum Return Coolant Temperature. If yes, the method proceeds to step 410, if no, the method proceeds to step 412.

In step 410, the controller 112 transmits a signal that causes the three-way control valve 110 to route the path of the return fluid passing through in the control valve 110 such that the return fluid flows out output port 142 and does not flow out the first output port 130. In other words, the input port 128 and the second output port 142 are connected in a flow path. In this condition, when return fluid flows out output port 142 and does not flow out the first output port 130, the three-way valve is considered to be "closed". The controller 112 may also transmit a signal that stops operation of the pump 140.

In step 412, the controller 112 determines if the (measured) Return Coolant Temperature is greater than or equal to the Target Return Coolant Temperature. If yes, the method proceeds to step 414, if no, the method proceeds to step 416.

In step 414, the controller 112 transmits a signal that causes the three-way control valve 110 to allow a portion of the return coolant flowing through the control valve 110 to flow out of the first output port 130 and the remaining portion to flow out of the second output port 142 into the conduit 144. In embodiments in which the pump 140 is a variable-flow pump, instead of a constant output pump, the controller 112 may also transmit a signal that causes the pump 140 to increase the flow of supply coolant exiting the pump. This increases the flow of the combination of engine coolant and return coolant entering the heat exchanger 104.

In step 416, the controller 112 determines if the engine load is less than an engine load threshold value. If yes, the method proceeds to step 418. If no, the method proceeds to step 420.

The controller 112, in step 418, transmits a signal that causes the three-way control valve 110 to block the path of the return coolant through the second output port 142 but allow return coolant to flow through the first output port 130. In this condition, the three-way control valve is considered to be "open". In embodiments in which the pump 140 is a variable-flow pump, instead of a constant output pump, the controller 112 may also transmit a signal that causes the pump 140 to increase the flow of supply coolant exiting the pump 140.

In step 420, the controller transmits a signal that causes the three-way control valve 110 to block the path of the return coolant through the second output port 142 but to allow return coolant to flow through the first output port 130. The controller 112 also transmits a signal that stops the pump 140.

Figure 6:
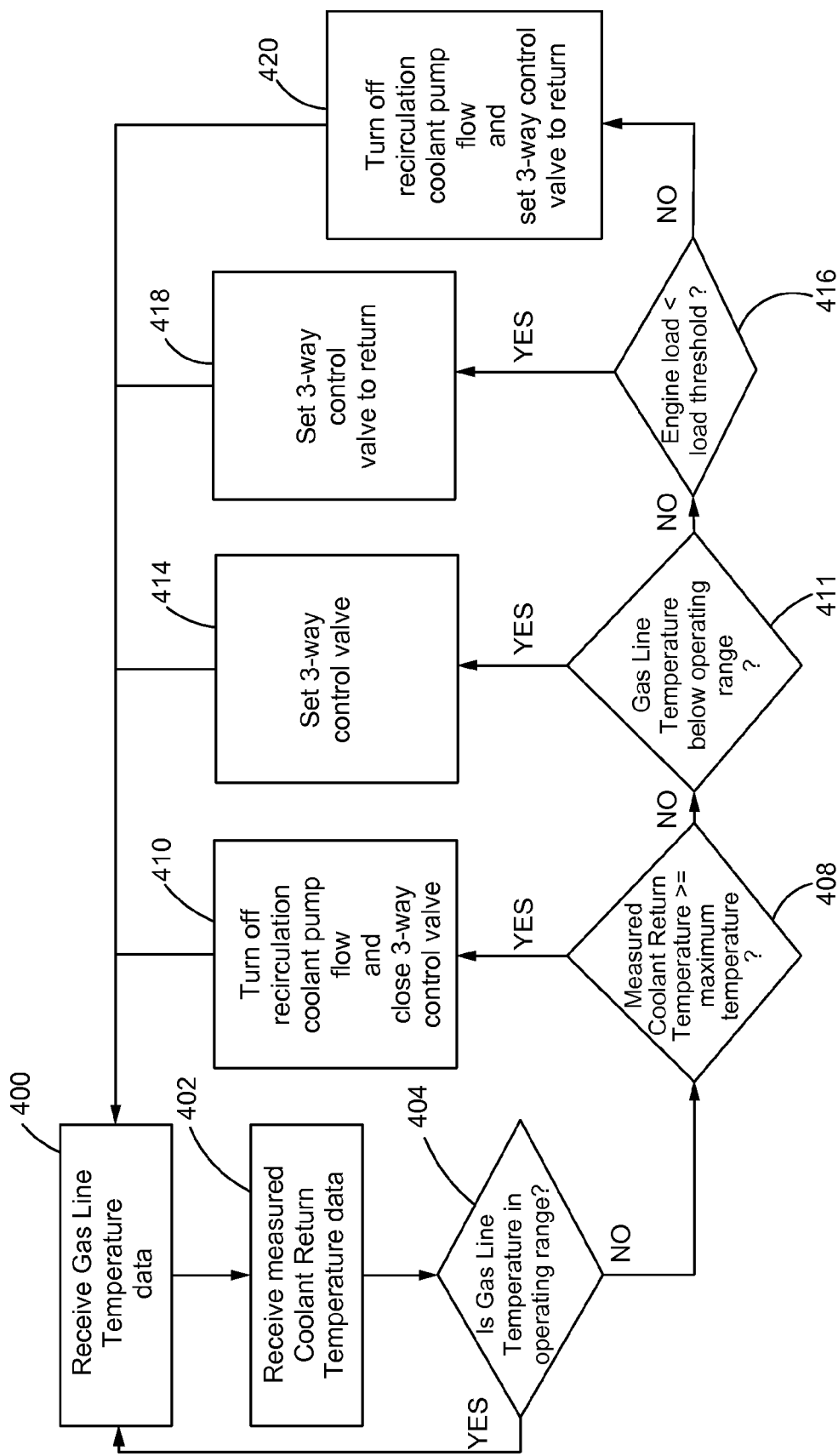
FIG. 6 is flowchart illustrating exemplary steps of another method of controlling the fuel mass of compressed natural gas received by an engine in accordance with the teachings of this disclosure.

Referring now to FIG. 6, an exemplary flowchart is illustrated showing sample steps which may be followed in controlling the fuel mass of CNG received by the engine 102 with the embodiment of the system 100 illustrated in FIG. 2 that includes the three-way control valve 110 and the pump 140. The method may be practiced with more or less than the number of steps shown and is not limited to the order shown. The method of FIG. 6 is the same as that of FIG. 5 except that step 406 is omitted and step 411 is substituted for step 412. As such only step 411 will be discussed below.

In step 411, the controller 112 determines if the Gas Line Temperature is below the operating range. If yes, the method proceeds to step 414, if the Gas Line Temperature is above the operating range, the method proceeds to step 416.

Both FIGS. 4-6 may be modified to also include the steps illustrated in FIG. 7, or alternatively, FIG. 8. These steps maintain the fuel mass of the CNG received by the engine 100 by adjusting the duration of the injection of CNG into the combustion chamber of the engine in the event that the temperature of the CNG varies either within the operating range or outside of the operating range.

Referring now to FIG. 7, an exemplary flowchart is illustrated showing sample steps which may be followed in controlling the fuel mass of CNG received by the engine 102 with the embodiment of the system 100 illustrated in either FIG. 1 or 2. The method may be practiced with more or less than the number of steps shown and is not limited to the order shown.

Step 500 includes receiving, by the controller 112, gas rail temperature information from the front and back sensors 127, 129. In one embodiment, the temperature of the CNG in the gas rail at the front of the bank 105 of injectors 106 may be measured by the front temperature sensor 127 proximal to the first injector 106a in the bank 105 of injectors (the "Front Gas Rail Temperature"), and the temperature of the CNG in the gas rail at the rear of the bank 105 may be measured by the back temperature sensor 129 proximal to the last injector 106z in the bank 105 (the "Back Gas Rail Temperature").

In step 502, the controller 112 determines a gas rail temperature at each one of the injectors 106 in the bank 105 as a function of the engine speed, the CNG demand, the relative position of the injector in the bank (first, second, third etc.), and the measured Front and Back Gas Rail Temperatures.

In step 504, for each injector 106, the controller 112 selects a CNG Waveform Duration Scaling Factor from a map as a function of the CNG gas rail temperature at the injector 106.

In step 508, the controller 112 adjusts the injection duration of each injector 106 based on the CNG Waveform Duration Scaling Factor for the injector 106.

Alternatively, the fuel mass of CNG received by the engine 102 may be controlled by following the process steps illustrated in FIG. 8 where the temperature of the CNG is measured at the CNG gas rail inlet 113 (instead of at the front and back of the injector bank 105) and the temperature at each injector is estimated.

Step 600 includes receiving, by the controller 112, CNG Gas Rail Inlet Temperature information from the gas rail inlet sensor 125.

In Step 602, the controller 112, selects the (estimated) CNG gas rail temperature at the back of the injector bank 105 from a map as a function of engine speed, engine coolant temperature, CNG demand, diesel rail pressure demand, and CNG Gas Rail Inlet Temperature.

In step 604, the controller 112 determines CNG gas rail temperature at each injector 106 as a function of engine speed, CNG demand, the relative position of the injector cylinder in the bank of cylinders, the measured CNG Gas Rail Inlet Temperature, and the selected (estimated) CNG gas rail temperature at the rear of the injector bank 105.

In step 606, the controller 112 selects a CNG Waveform Duration Scaling Factor for each injector 106 from a map as a function of CNG gas rail temperature at the injector 106.

In step 608, the controller 112 adjusts the duration of each injector 106 based on the CNG Waveform Duration Scaling Factor.

Also disclosed is a method of controlling the fuel mass of compressed natural gas received by an engine. The method may comprise receiving a Gas Line Temperature for compressed natural gas disposed in a gas line, and maintaining, by a controller operably connected to a control valve, the Gas Line Temperature within an operating range by adjusting the amount of return coolant allowed to flow through the control valve based at least in part on the Gas Line Temperature and a Target Return Coolant Temperature. In an embodiment, the gas line may be disposed between a heat exchanger and the engine, and the heat exchanger may be configured to receive compressed liquid natural gas and supply coolant and to output the compressed natural gas into the gas line and to output return coolant. The control valve may be configured to receive return coolant from the heat exchanger.

Also disclosed is a computer program product. The computer program product may comprise a non-transitory computer usable medium having a computer readable program code embodied therein. The computer readable program code may be adapted to be executed to implement a method for controlling the fuel mass of compressed natural gas received by an engine, the method comprising receiving a Gas Line Temperature for compressed natural gas disposed in a gas line, and maintaining, by a controller operably connected to a control valve, the Gas Line Temperature within an operating range by adjusting the amount of return coolant allowed to flow through the control valve based at least in part on the Gas Line Temperature and a Target Return Coolant Temperature. In an embodiment, the gas line may be disposed between a heat exchanger and the engine, and the heat exchanger may be configured to receive compressed liquid natural gas and supply coolant and to output the compressed natural gas into the gas line and to output return coolant. The control valve may be configured to receive return coolant from the heat exchanger.

The features disclosed herein may be particularly beneficial for use with mining, earth moving, construction or material handling vehicles.

What is claimed is:

1. A method for controlling the fuel mass of CNG received by an engine, the method comprising:
   receiving a Gas Line Temperature for CNG disposed in a gas line, the gas line disposed between a heat exchanger and the engine, the heat exchanger configured to receive CLNG and supply coolant and to output the CNG into the gas line and to output return coolant to a control valve;
   maintaining, by a controller operably connected to the control valve, the Gas Line Temperature within an operating range by adjusting the amount of return coolant allowed to flow through the control valve based at least in part on the Gas Line Temperature and a Target Return Coolant Temperature; and
   pumping supply coolant and a portion of the return coolant to the heat exchanger, wherein the control valve is a three-way valve configured to divert to a pump a portion of the return coolant flowing through the control valve.

2. The method of claim 1, wherein the operating range spans about 5° C.

3. The method of claim 1, wherein, the Target Return Coolant Temperature is based on at least one system parameter.

4. The method of claim 1, wherein the pumping step occurs when a measured Return Coolant Temperature is greater than or equal to the Target Return Coolant Temperature.

5. The method of claim 1, further comprising varying, by the controller, the duration of injection by the injector to maintain a generally consistent fuel mass of CNG received by the engine, the controller operably connected to the injector.

6. A system for controlling the fuel mass of CNG received by an engine, the system comprising:
   a heat exchanger configured to receive CLNG and supply coolant and to output CNG and return coolant;
   an injector operably connected to the engine and configured to inject the CNG into the engine;
   a gas line disposed between the injector and the heat exchanger, the gas line configured to carry CNG from the heat exchanger to the injector, the CNG in the gas line at a Gas Line Temperature;
   a control valve configured to receive return coolant from the heat exchanger and to change the amount of return coolant flowing through control valve;
   a conduit extending between the control valve and a pump, wherein the control valve is a three-way valve configured to divert a portion of the return coolant flowing through the control valve to the pump, and the pump is configured to pump supply coolant and the portion of the return coolant to the heat exchanger; and
   a controller operably connected to the control valve, the controller configured to maintain the Gas Line Temperature within an operating range by adjusting the amount of return coolant allowed to flow through the control valve based, at least in part, on the Gas Line Temperature and a Target Return Coolant Temperature.

7. The control system of claim 6 wherein the operating range spans about 5° C.

8. The control system of claim 6, wherein the operating range is about a target Gas Line Temperature.

9. The control system of claim 6, wherein the Target Return Coolant Temperature is based on at least one system parameter.

10. The control system of claim 9, wherein the system parameter comprises engine speed.

11. The control system of claim 10, wherein the supply coolant is received by the heat exchanger from the engine and the system parameter further comprises a supply temperature for the supply coolant.

12. The control system of claim 9, wherein the system parameter is LNG pump flow demand.

13. The control system of claim 6, in which the controller is further configured to maintain the Gas Line Temperature within an operating range by adjusting the amount of return coolant allowed to flow through the control valve based, at least in part, on the Gas Line Temperature, a Target Return Coolant Temperature, and a measured Return Coolant Temperature.

14. The control system of claim 6, in which the heat exchanger includes a first inlet, a first outlet, a second inlet and a second outlet, and the heat exchanger is configured to receive CLNG through the first inlet and supply coolant through the second inlet, the heat exchanger further configured to output CNG from the first outlet, and return coolant from the second outlet.

15. The control system of claim 6, wherein the controller is further configured to adjust the control valve to divert the portion of the return coolant flowing into the control valve to the pump if a measured Return Coolant Temperature is greater than or equal to the Target Return Coolant Temperature.

16. The control system of claim 15, in which the controller is further configured to increase the recirculation of the pump if the measured Return Coolant Temperature is greater than or equal to the Target Return Coolant Temperature.

17. The control system of claim 6, wherein the controller is further configured to open the control valve if an engine load is less than a threshold.

18. A computer program product comprising a non-transitory computer usable medium having a computer readable program code embodied therein, the computer readable program code adapted to be executed to implement a method for controlling the fuel mass of CNG received by an engine, the method comprising:

receiving a Gas Line Temperature for CNG disposed in a gas line, the gas line disposed between a heat exchanger and the engine, the heat exchanger configured to receive CLNG and supply coolant and to output the CNG into the gas line and to output return coolant; and maintaining, by a controller operably connected to a control valve, the Gas Line Temperature within an operating range by adjusting the amount of return coolant allowed to flow through the control valve based at least in part on the Gas Line Temperature and a Target Return Coolant Temperature, wherein the control valve is configured to receive return coolant from the heat exchanger and to divert a portion of the return coolant flowing through the control valve to a pump, and the pump is configured to pump supply coolant and the portion of the return coolant to the heat exchanger.

* * * * *